United States Patent

[11] 3,607,024

| [72] | Inventors | Gennady Ivanovich Vilesov<br>Kiev;<br>Pavel Ivanovich Gorbik, Sumy; Leonard Stanislavovich Pioro, Kiev; Ivan Andreevich Makarov, Kiev; Mark Efimovich Giller, Sumy; Anatoly Mitrofanovich Osnach, Kiev; Mikhail Samoilovich Golderbiter, Sumy; Boris Semenovich Chechik, Sumy; Ivan Mikhailovich Kilochitsky, Sumy, all of U.S.S.R. |
|---|---|---|
| [21] | Appl. No. | 738,346 |
| [22] | Filed | June 19, 1968 |
| [45] | Patented | Sept. 21, 1971 |
| [73] | Assignee | Institut Gaza<br>ul. Parkhomenko, Kiev, U.S.S.R. |

[54] HYDROTHERMAL METHOD OF PRODUCING DEFLUORINATED PHOSPHATES
5 Claims, 1 Drawing Fig.

[52] U.S. Cl. .................................................. 23/108
[51] Int. Cl. .................................................. C01b 25/32
[50] Field of Search ........................................ 23/108

[56] References Cited
UNITED STATES PATENTS

| 2,143,865 | 1/1939 | Copson ........................ | 23/108 |
| 2,474,831 | 7/1949 | Elmore......................... | 23/108 X |
| 2,499,385 | 3/1950 | Hubbuch et al. ............. | 23/108 |
| 2,642,355 | 6/1953 | Pike ............................. | 23/106 |

Primary Examiner—Oscar R. Vertiz
Assistant Examiner—Charles B. Rodman
Attorney—Waters, Roditi, Schwartz & Nissen ABSTRACT: Defluorinated phosphates are produced by melting a natural phosphate in a melting zone and burning a fuel within the melt of the natural phosphate.

PATENTED SEP 21 1971  3,607,024
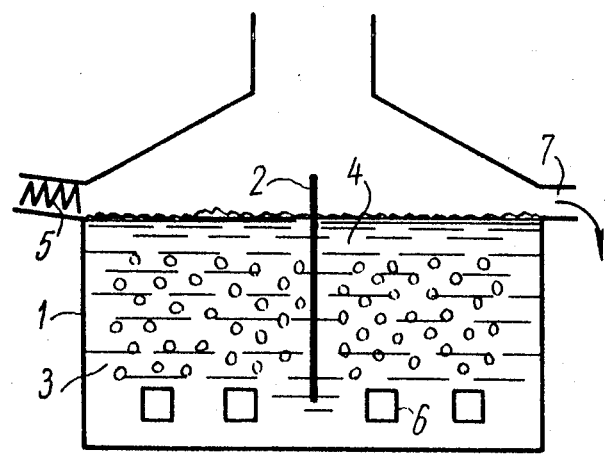

HYDROTHERMAL METHOD OF PRODUCING DEFLUORINATED PHOSPHATES

The present invention relates to hydrothermal methods of producing defluorinated phosphates for use as fertilizers and as mineral additions to animal rations.

A hydrothermal method of producing defluorinated phosphates is known, wherein the combustion products of a fuel are bubbled through a melt of natural phosphates, the fuel being burned in a separate furnace.

A disadvantage of said known method is the low intensity of the defluorinating process due to the fact that the phosphate melt is not treated with combustion products at the moment of their formation.

It is the object of the present invention to provide a method of producing defluorinated phosphates making it possible to intensify the process of defluorination.

The foregoing and additional objects have been accomplished by the provision of a method of producing defluorinated phosphates, wherein through a melt of natural phosphates there are bubbled the combustion products of a fuel, said combustion products being obtained, according to the invention, by burning the fuel directly within the melt.

Burning the fuel within the melt intensifies the defluorination process since it involves water vapor and atomic hydrogen at the moment of their formation, i.e. in their most reactive form.

In addition, burning fuel within the melt substantially intensifies heat and mass exchange between the melt and the combustion products due to the formation of a large interface.

The present method can be carried out in shaft furnaces or in batch or continuous water-cooled installations of the converter type, heat insulated internally with natural phosphates.

When defluorination is carried out in shaft furnaces and the initial phosphates have a high melting point, additives, for example silica, must be used to lower the melting point, thus preventing damage to the furnace lining. Additives, however, lower the $P_2O_5$ content of the product.

If defluorination is carried out in converter-type installations as mentioned above, natural phosphates having any melting point can be used without additives.

If silica is not used as an additive the defluorinated phosphate obtained is suitable for use as fertilizer or as a mineral addition to animal rations.

The invention will now be described in greater detail with reference to the accompanying drawing in which is shown a schematic diagram of a continuous converted in which the present method of producing defluorinated feed and fertilizer phosphates is carried out.

The converter consists of water-cooled bath 1 which is divided by partition 2 into two chambers: melting chamber 3 and overflow chamber 4. The number of chambers is determined by the fluorine content of the initial phosphates and the degree to which they must be defluorinated—the higher the fluorine content of the initial phosphates and the greater the degree of defluorination, the greater should be the number of chambers.

The initial natural phosphates in the form of granules, powder or moistened mass are fed by means of charging device 5 into melting chamber 3 of the converter. Phosphoric acid, potassium metaphosphate or other phosphorus-containing compounds can be added to the natural phosphates before charging in order to increase the $P_2O_5$ content of the product; this also lowers the melting point of the natural phosphates.

The natural phosphates may be charged onto the surface of the melt as shown in the drawing, or directly into the melt or together with the combustion products. Fuel is fed into the baths through burners 6 and is burned within the melt.

It is preferable to use fuel which gives the maximum amount of water vapor in the combustion products. If fuel is used combustion combustion does not provide sufficient water vapor for the process, water vapor may be introduced into the melt in some other way, for example, with the air used for burning the fuel.

The molten product from overflow chamber 4 flows continuously through tap 7 into a granulating installation (not shown in the drawing).

The present method enables the production of defluorinated fertilizer and feed phosphates with a F content less than 0.2 and a $P_2O_5$ content (soluble in 0.4 percent HCl) of 37–41 percent.

For a better understanding of the invention the following example of producing defluorinated phosphates is given by way of illustration.

EXAMPLE

Apatite concentrate containing 39–40 percent $P_2O_5$ and 3–3.5 percent F is defluorinated in a water-cooled converter having a bath of 0.4 m.$^3$ useful capacity, at a temperature of 1,500–1,580° C., The fuel is natural gas which on combustion provides sufficient water vapor for the process.

The product obtained has a F content of 0.15 percent and a $P_2O_5$ content (soluble in 0.4 percent HCl) of 40 percent.

Though the present invention has been described in accordance with a preferred embodiment various changes and modifications may be made in carrying out the present invention without departing from the spirit and scope thereof, as will be understood by those skilled in the art. These changes and modifications are to be considered as falling within the spirit and scope of the invention as defined in the appended claims.

What we claim is:

1. A method for producing defluorinated phosphates which comprises introducing a natural phosphate into a melting zone, melting the natural phosphate in the melting zone to form a melt thereof, the introducing natural gas into the thus formed melt burning the natural gas within the melt, bubbling the combustion products of the thus burned natural gas through the melt and removing the melt from the melting zone.

2. A method according to claim 1 wherein the natural phosphate is apatite.

3. A method according to claim 1 wherein a phosphorus containing compound is added to the natural phosphate before same is introduced into the melting zone to increase the $P_2O_5$ content thereof.

4. A method according to claim 1 wherein the melting and burning are effected at a temperature of 1,500°–1,580° C.

5. A method according to claim 1 wherein the natural phosphate is a natural calcium phosphate.